United States Patent [19]
Tamai et al.

[11] Patent Number: 5,397,974
[45] Date of Patent: Mar. 14, 1995

[54] RECHARGEABLE BATTERY OVERDISCHARGE PREVENTION CIRCUIT

[75] Inventors: Mikitaka Tamai, Sumoto; Takaharu Ohira, Komatsushima; Tetsuya Okada, Sumoto, all of Japan

[73] Assignee: Sanyo Electric Co., Ltd., Osaka, Japan

[21] Appl. No.: 182,568

[22] Filed: Jan. 18, 1994

[30] Foreign Application Priority Data

Jan. 19, 1993 [JP] Japan ................................ 5-006748
Mar. 10, 1993 [JP] Japan ................................ 5-049337

[51] Int. Cl.⁶ .................................................. H02J 7/00
[52] U.S. Cl. ............................................ 320/13; 361/92
[58] Field of Search ...................... 320/13; 361/18, 58, 361/86, 92

[56] References Cited

U.S. PATENT DOCUMENTS

| | | | |
|---|---|---|---|
| 3,621,276 | 11/1971 | Mitchell | 320/13 |
| 3,648,145 | 3/1972 | Meyer et al. | 320/13 |
| 4,132,942 | 1/1979 | Yamamoto | 320/13 |
| 4,342,953 | 8/1982 | Collins | 320/13 |
| 4,439,805 | 3/1984 | Tarleton | 361/92 |
| 4,698,578 | 10/1987 | Mullersman et al. | 320/13 |
| 5,073,837 | 12/1991 | Baek | 361/92 |
| 5,177,426 | 1/1993 | Nakanishi et al. | 320/13 |
| 5,179,337 | 1/1993 | Staarman et al. | 320/13 |

FOREIGN PATENT DOCUMENTS

| | | | |
|---|---|---|---|
| 64-23731 | 1/1989 | Japan. | |
| 4-33271 | 2/1992 | Japan. | |
| 0698081 | 11/1979 | U.S.S.R. | 320/13 |
| 0904035 | 2/1982 | U.S.S.R. | 320/13 |

OTHER PUBLICATIONS

Swift et al., "Protect Your Rechargeable Battery", Jun. 7, 1978, pp. 112–114 of Electronic Design.

*Primary Examiner*—Kristine L. Peckman
*Attorney, Agent, or Firm*—Wenderoth, Lind & Ponack

[57] ABSTRACT

A first switch element is connected in series with a rechargeable battery, a second switch element is connected in parallel to the series circuit of the rechargeable battery and the first switch element, and a control circuit controls ON and OFF states of the first switch element and the second switch element. The control circuit is so constructed as to turn OFF the first switch element to stop discharging and at the same time turn ON the second switch element when the battery voltage becomes lower than a predetermined value. The second switch element maintains the first switch element in OFF state even when the battery voltage of the rechargeable battery rises by self resetting of the rechargeable battery. When a charging voltage is applied to the rechargeable battery, the control circuit then turns ON the first switch element and turns OFF the second switch element.

15 Claims, 4 Drawing Sheets

RECHARGEABLE BATTERY OVERDISCHARGE PREVENTION CIRCUIT

BACKGROUND OF INVENTION

The present invention relates to an overdischarge prevention circuit for a rechargeable battery.

A rechargeable battery that is repeatedly usable by recharging suffers a reduced battery quality and a shortened battery life when the rechargeable battery is allowed to discharge such that the battery voltage of the same becomes lower than a predetermined value. In order to prevent such overdischarging of a rechargeable battery, a circuit has been adopted in which the battery voltage of the rechargeable battery is detected and discharging of the rechargeable battery is interrupted when the detected battery voltage becomes lower than a predetermined value. For example, in Japanese Non-examined Patent Publication No.4-33271 published Feb. 4, 1992, an overdischarge prevention circuit is described in which a switch element is connected in series to the rechargeable battery, the switch element being so constructed as to be turned OFF when the battery voltage of the rechargeable battery becomes lower than a predetermined value. Whereby discharging of the rechargeable battery is interrupted.

In the overdischarge prevention circuit described in the noted Japanese Patent Publication, the switch element connected in series to the rechargeable battery is kept in an OFF state until the battery voltage of the rechargeable battery becomes somewhat higher than the predetermined value, and when the battery voltage becomes somewhat higher than the predetermined value, the switch element is turned ON to start discharging again.

In the above-mentioned overdischarge prevention circuit, a hysteresis is provided between a voltage for interrupting discharging and a voltage for starting discharging again. This hysteresis is provided for preventing chattering, namely, repeated turning ON and OFF of the switch element caused by the rise of the battery voltage of the rechargeable battery through self resetting after the interruption of discharging. An overdischarge prevention circuit provided with a hysteresis can prevent intermittent continuance of discharging from a rechargeable battery. However, in such a overdischarge prevention circuit, it is very difficult to determine the range of a hysteresis voltage between a voltage for interrupting discharging and a voltage for starting discharging again.

When the range of the hysteresis voltage is too large, discharging from the rechargeable battery cannot be started again until the rechargeable battery is sufficiently charged. On the contrary, when the range of the hysteresis voltage is too small,chattering of the switch element cannot be prevented.

SUMMARY OF INVENTION

The present invention is for solving the above-mentioned drawbacks of the prior art.

An important object of the present invention is to provide an overdischarge prevention circuit which can reliably prevent overdischarging of a rechargeable battery, using a simple circuit.

An overdischarge prevention circuit for a rechargeable battery according to the present invention includes a redischargeable and redischargeable rechargeable battery, a first switch element connected in series to the rechargeable battery, a second switch element connected in parallel to the series connected rechargeable battery and first switch element, and a control means for controlling ON and OFF states of the first and second switch elements.

The control means turns OFF the first switch element and at the same time turns ON the second switch elements when the voltage of the rechargeable battery becomes lower than a predetermined value. Further, the control means turns ON the first switch means when a charge voltage is applied to the rechargeable battery.

This overdischarge prevention circuit interrupts the discharge of the rechargeable battery when the battery voltage of the rechargeable battery becomes lower than a predetermined value. On the other hand, the overdischarge prevention circuit allows the discharge of the rechargeable battery when a charge voltage is applied to the rechargeable battery.

This object of the present invention will be explained hereinafter with reference to the appended drawings.

DETAILED DESCRIPTION OF PREFERRED EMBODIMENTS

Figure 1:
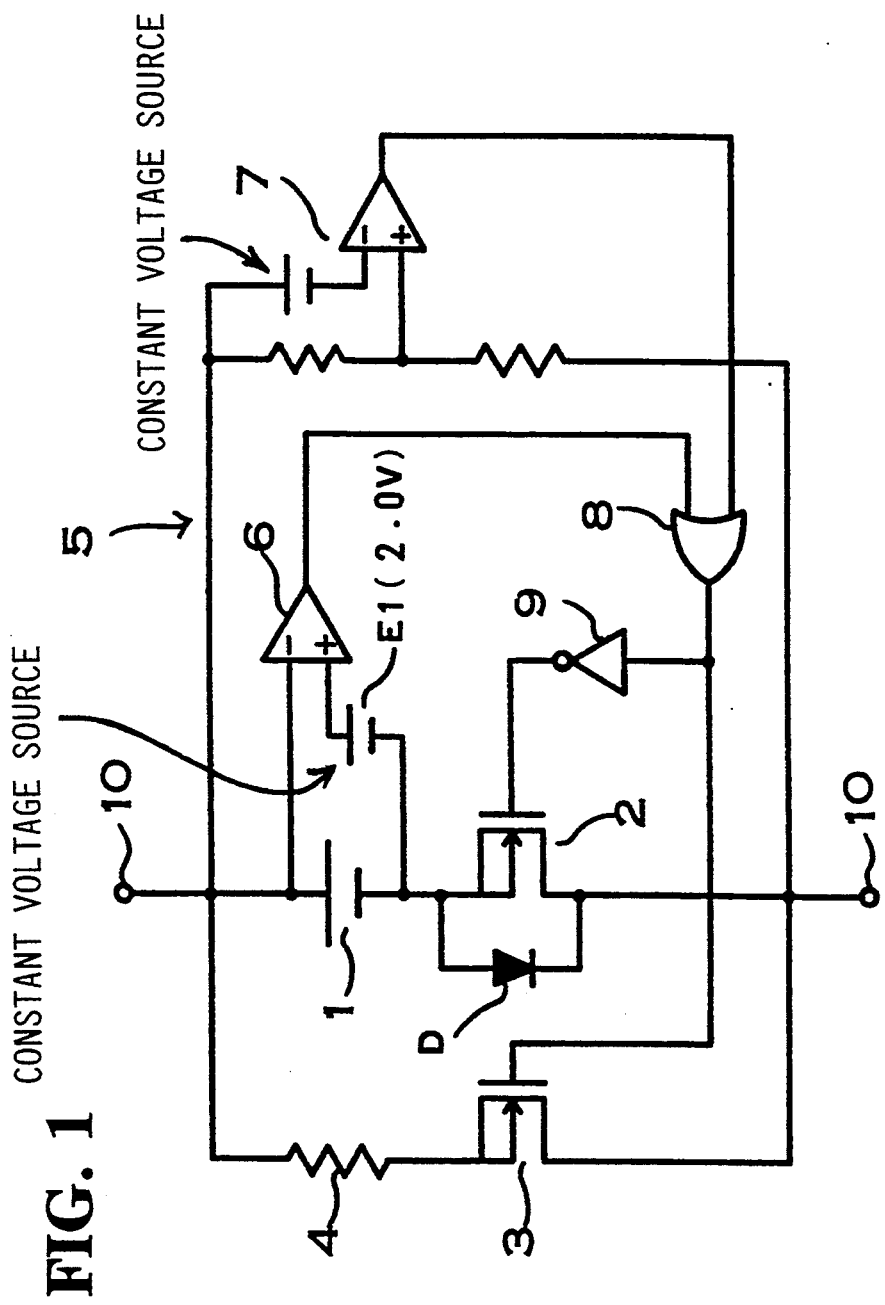
FIG. 1 is a circuit diagram showing a first embodiment of the present invention.

FIG. 1 depicts an overdischarge prevention circuit of the first embodiment of the present invention. This overdischarge prevention circuit includes a rechargeable battery 1 which is, for example, a lithium-ion rechargeable battery, and a first switch element 2 which is constituted by a MOSFET connected in series to the rechargeable battery 1. A parasitic diode D is connected in parallel to the MOSFET. The parasitic diode D is connected in such a direction that the rechargeable battery 1 can be charged. A second switch element 3 and a resistance element 4 are connected in parallel to the series circuit connecting the rechargeable battery 1 and the first switch element 2. Similarly to the first switch element 2, the second switch element 3 is constituted by a MOSFET, and the resistance element 4 has a high resistance such as 100K $\Omega$.

The resistance element 4 is not always necessary, but it is preferably provided. This is because an overdischarge prevention circuit provided with a resistance element can reliably detect the fact that a charge voltage is applied to the rechargeable battery 1. Further advantageously, the resistance element 4 can prevent the rechargeable battery 1 from being shortcircuited when both of the first switch element 2 and the second switch element 3 are turned ON.

The overdischarge prevention circuit is further provided with a control circuit 5 for controlling ON and OFF states of the first switch element 2 and the second switch element 3. The control circuit 5 is provided with a first detector 6, a second detector 7, an OR gate 8 and an inverter 9. The first detector 6 detects the battery voltage of the rechargeable battery 1, and detector 6 produces a low level signal when the detected voltage is higher than a reference voltage E1(2.0 V in this embodiment), and produces a high level signal when it is lower than 2.0 V. The second detector 7 produces a low level signal when the voltage applied to both ends of the rechargeable battery 1 is higher than 1.(E2), and produces a high level signal when it is lower than 1.9 V. The OR gate 8 and the inverter 9 constitute a change-over circuit which turns ON or OFF the first switch element 2 and the second switch element 3 in accordance with outputs of the first detector 6 and the second detector 7. In FIG. 1, numerals 10, 10 indicate charging and discharging terminals of the rechargeable battery 1.

In the overdischarge prevention circuit having the above-mentioned structure, the first switch element 2 is in an ON state and the second switch element 3 is in an OFF state when the rechargeable battery 1 is discharged by connecting a load to the charging and discharging terminals 10. Then the battery voltage of the rechargeable battery 1 is monitored by the first detector 6.

When the first detector 6 detects that the battery voltage of the rechargeable battery 1 is lower than 2.0 V, the first detector 6 produces a high level signal. This high level signal is applied through the OR gate 8 and the inverter 9 to the first switch element 2, and is applied through the OR gate 8 to the second switch element 3. Therefore, the first switch element 2 is put into an OFF state and the second switch element 3 is put into an ON state. As a result, discharging from the rechargeable battery 1 is interrupted.

When both of the switch elements 2,3 are so switched as above-mentioned, sometimes the battery voltage of the rechargeable battery 1 becomes higher than 2.0 V through self resetting and therefore the first detector 6 produces a low level signal, but since the second switch element 3 is in an ON state, the voltage between the charging and discharging terminals 10, 10 is OV, and therefore the second detector 7 produces a high level signal. As a result, the first switch element 2 is kept in an OFF state and the second switch element 3 is kept in ON state respectively. Therefore, chattering of the first switch element 2 is prevented from occurring, and the intermittent continuance of discharging from the rechargeable battery 1 can be entirely prevented.

In this state, when a charging voltage higher than 1.9 V (usually a constant voltage of 4.2 V) is applied to the charging and discharging terminal 10 by a charger(not shown), the second detector 7 detects the applied charging voltage and the second detector 7 produces a low level signal. On the other hand, when the battery voltage of the rechargeable battery 1 becomes higher than 2.0 V through self resetting, the first detector 6 also produces a low level signal. Therefore, the output of the OR gate 8 is also a low level signal, and the first switch element 2 is put into an ON state and the second switch element 3 is put into an OFF state. As a result, the interruption of the discharging of the rechargeable battery 1 is removed.

When the battery voltage of the rechargeable battery 1 does not become higher than 2.0 V through self resetting, the first detector 6 produces a high level signal. Therefore, the first switch element 2 is not immediately put into an ON state and the second switch element 3 is not immediately put into an OFF state even when a charging voltage is applied to the charging and discharging terminal 10 and the second detector 7 produces a low level signal. However, with the application of the charging voltage to the charging and discharging element 10, the rechargeable battery 1 is charged with a charging current flowing through the parasitic diode D, and the battery voltage of the rechargeable battery 1 is raised to become higher than 2.0 V. At this time, the output of the first detector 6 becomes a low level signal, and the first switch element 2 is put into an ON state and the second switch element 3 is put into an OFF state, so that the interruption of the discharging of the rechargeable battery 1 is removed.

As above-mentioned, when the battery voltage of the rechargeable battery 1 becomes lower than 2.0 V, discharging from the battery voltage 1 is interrupted by turning OFF the first switch element 1, and on the other hand, when a charging voltage is applied to tile rechargeable battery 1, the interruption of discharging from the rechargeable battery 1 is removed by turning ON the first switch means 2, whereby the rechargeable battery 1 becomes dischargeable.

Figure 2:
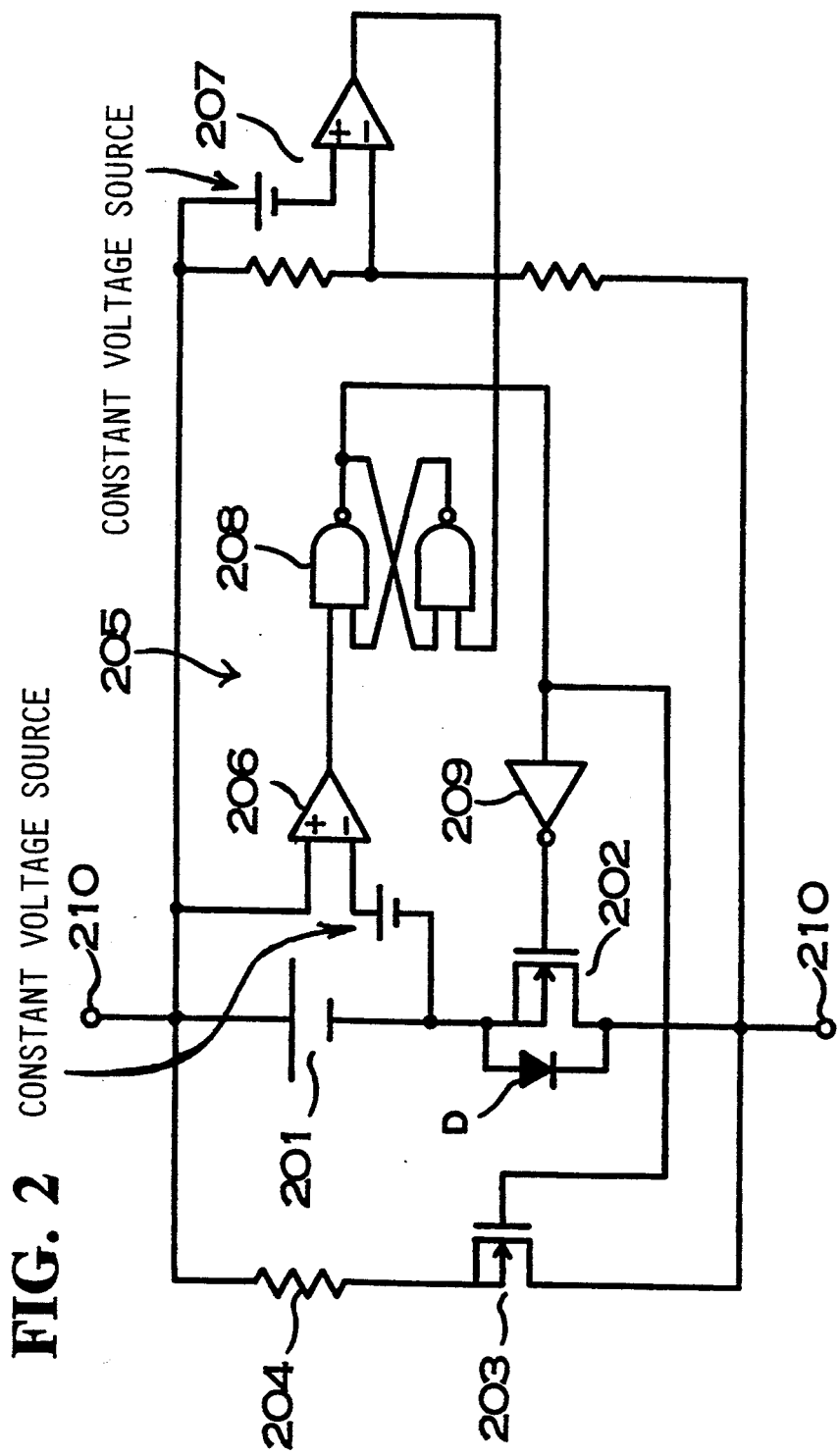
FIG. 2 is a circuit diagram showing a second embodiment of the present invention.

FIG.2 is a circuit diagram showing the second embodiment of the present invention. This second embodiment is different from the first embodiment with respect to the structure of the control circuit 205.

The control circuit 205 of this embodiment comprises a first detector 206, a second detector 207, a flip-flop 208 and an inverter 209. The first detector 206 detects the battery voltage of the rechargeable battery 201, and first produces a high level signal when the battery voltage is higher than 2.0 V, and produces a low level signal when it is lower than 2.0 V. The second detector 207 produces a low level signal when the voltage applied to both ends of the rechargeable battery 201 is higher than 3.0 V, and produces a high level signal when it is lower than 3.0 V. The flip-flop 208 and the inverter 209 constitute a change-over circuit which turns ON or OFF the first switch element 202 and the second switch element 203 in accordance with outputs of the first detector 206 and the second detector 207.

In this overdischarge prevention circuit, when the battery voltage of the rechargeable battery 201 is near a value of the full charge, for example, 4.0 V, the output of the first detector 206 becomes a high level signal and the output of the second detector 207 becomes a low level signal, and therefore, the output of the flip-flop 208 is a low level signal. As a result, the first switch element 202 is in an ON state and the second switch element 203 is in an OFF state, so that the rechargeable battery 201 is in dischargeable state.

When discharging from the rechargeable battery 201 continues and the battery voltage of the rechargeable battery 201 becomes lower than 3.0 V, the output of the second detector 207 becomes a high level signal. However, since the output of the first detector 206 is a high level signal, the output of the flip-flop 208 is maintained as a low level signal, and therefore, the rechargeable battery 1 is still in dischargeable state.

When discharging from the rechargeable battery 201 Further continues and the battery voltage of the rechargeable battery 201 becomes lower than 2.0 V, the output of the first detector 206 becomes a low level signal. As a result, the output of the flip-flop 208 becomes a high level signal, and the first switch element 202 is put into an OFF state and the second switch element 203 is put into an ON state, so that discharging from the rechargeable battery 201 is interrupted.

When each of the first and second switch elements 202, 203 is so operated as above-mentioned, the output of the flip-flop 208 is maintained as a high level signal even when the battery voltage of the rechargeable battery 201 becomes higher than 2.0 V through self resetting, and the first switch element 206 is kept in an OFF state and the second switch element 203 is kept in an ON state, so that interruption of discharging of the rechargeable battery 201 is continued.

In this state, when a charging voltage, (usually a constant voltage of 4.2 V) is applied to the charging and discharging terminal 10 by a charger (not shown), the second detector 207 detects the applied charging voltage and the output of the second detector 207 becomes a low level signal. Therefore, the output of the flip-flop 208 becomes a low level signal, and the first switch element 202 is put into an ON state and the second switch element 203 is put into an OFF state, so that interruption of discharging of the rechargeable battery 201 is removed.

Figure 3:
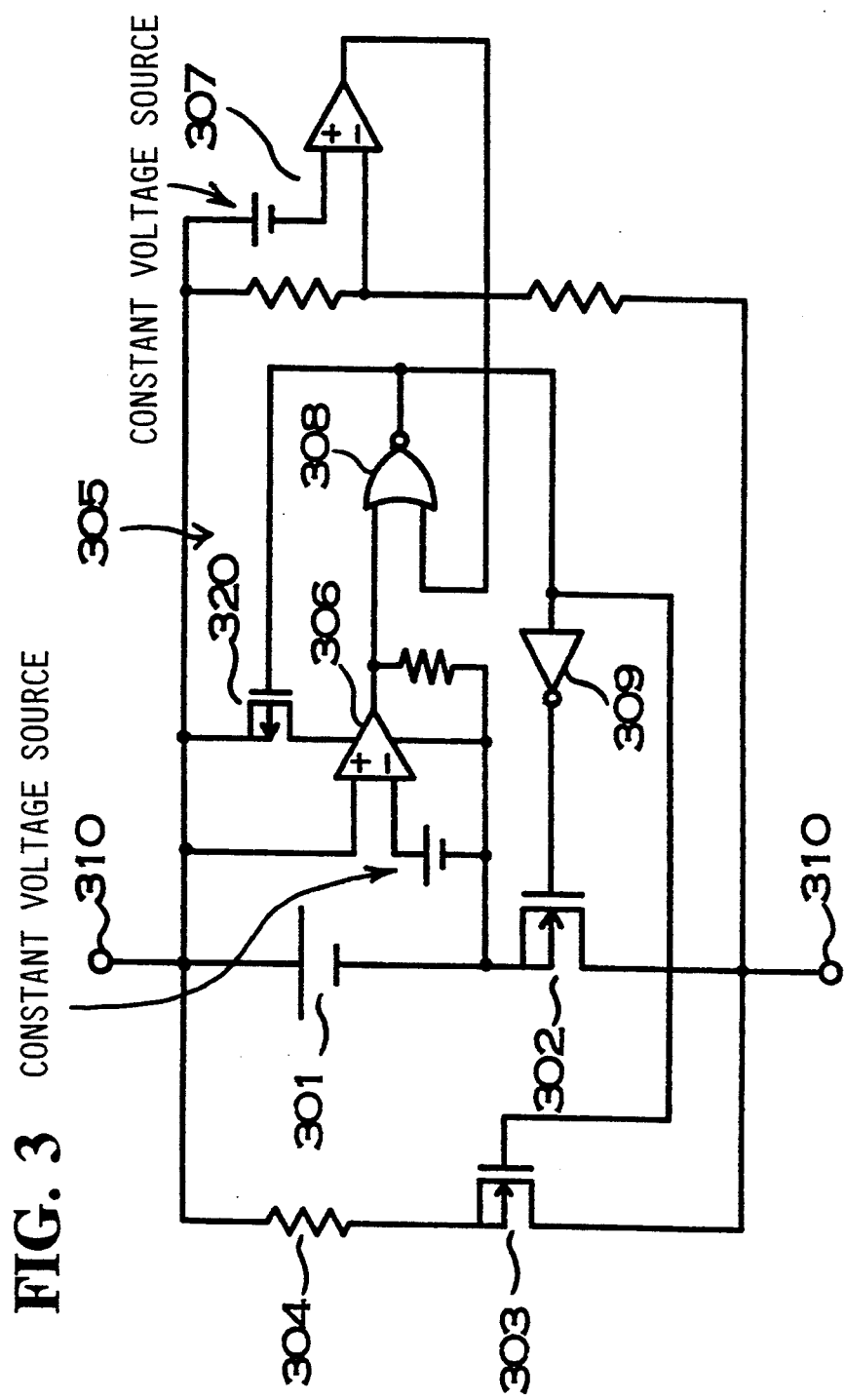
FIG. 3 is a circuit diagram showing a third embodiment of the present invention.

FIG. 3 is a circuit diagram showing the third embodiment of the present invention. The third embodiment is different from the first embodiment in that a parasitic diode D is not used in the MOSFET constituting the first switch element 2 and in that the control circuit 305 has a different structure. The control circuit 305 of this embodiment comprises a first detector 306 which produces a high level signal when the battery voltage of the rechargeable battery is higher than 2.0 V and produces a low level signal when it is lower than 2.0 V, a control switch element 320 which is constituted by a normal ON type FET and which controls electric power supply from the rechargeable battery 301 to the first detector 306, a second detector 307 which produces a high level signal when the voltage applied to both ends of the rechargeable battery 301 is higher than 3.0 V and produces a low level signal when it is lower than 3.0 V, and a NOR gate 308 which turns ON or OFF the first switch element 302, the second switch element 303 and the control switch element 320 in accordance with outputs of the first detector 306 and the second detector 307. In this charging circuit, the NOR gate 308 and the inverter 309 constitute a change-over circuit.

In an overdischarge prevention circuit of this embodiment, when the battery voltage of the rechargeable battery 301 is higher than 2.0 V, the output of the first detector 306 becomes a high level signal and the output of the NOR gate 308 is a low level signal. Therefore, the control switch element 320 is put into an ON state, and an electric power is supplied from the rechargeable battery 301 to the first detector 306 with the first switch element 302 being put into an ON state and the second switch element 303 being put into an OFF state, so that the rechargeable battery 301 is dischargeable.

When discharging of the rechargeable battery 301 continues and the battery voltage of the rechargeable battery 301 becomes lower than 3.0 V, the output of the second detector 307 becomes a low level signal. However, since the output of the first detector 306 is a high level signal, the output of the NOR gate 308 is maintained as a low level signal, and therefore, the rechargeable battery 1 is still in an dischargeable state.

When discharging from the rechargeable battery 301 further continues on and the battery voltage of the rechargeable battery 301 becomes lower than 2.0 V, the output of the first detector 306 becomes a low level signal. As a result, the output of the NOR gate 308 becomes a high level signal, and the first switch element 302 is put into an OFF state and the second switch element 303 is put into an ON state, so that discharging of the rechargeable battery 301 is interrupted.

Further, the control switch element 320 is also put into an OFF state and thereby undesirable consumption of electric current of the rechargeable battery 301 in the first detector 306 can be prevented.

When each of the first and second switch elements 302, 303 is so operated as above-mentioned, electric current supply to the first detector 306 is interrupted and the output of the first detector 306 is maintained as a low level signal even when the battery voltage of the rechargeable battery 301 becomes higher than 2.0 V through self resetting. As a result, the output of the NOR gate 308 is maintained as a high level signal, and the first switch element 302 is kept in an OFF state and the second switch element 303 is kept in an ON state, so that interruption of discharging of the rechargeable battery 301 is continued.

In this state, when a charging voltage (usually a constant voltage of 4.2 V) is applied to the charging and discharging terminal 10 by a charger (not shown), the second detector 307 detects the applied charging voltage and the output of the second detector 307 becomes a high level signal. Therefore, the output of the NOR gate 308 becomes a low level signal, and the first switch element 302 is put into an ON state and the second switch element 303 is put into an OFF state, so that interruption of discharging from the rechargeable battery 301 is removed. Further, the control switch element 320 is put into an ON state and an electric current is supplied to the first detector 306, so that detection of the battery voltage of the rechargeable battery 301 is started again.

Figure 4:
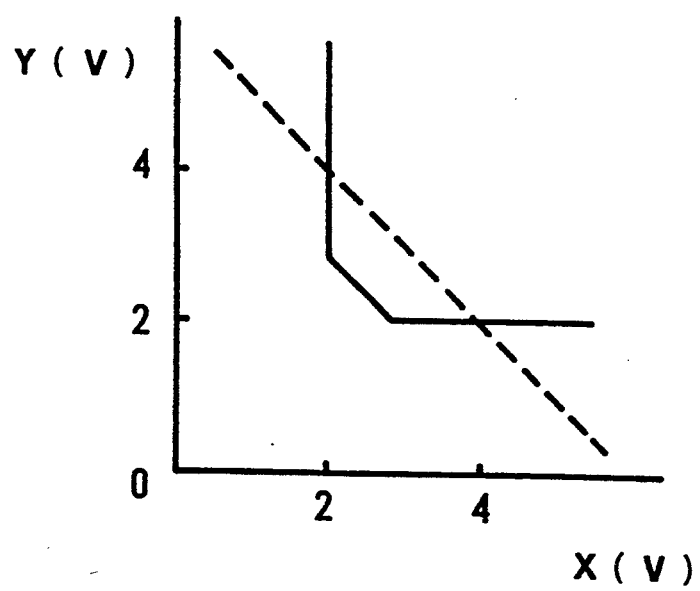
FIG. 4 is a graph showing the characteristic of the discharge voltage according to the present invention.

FIG. 4. shows a discharge voltage of two rechargeable batteries connected in series. In this graph, X indicates the battery voltage of one rechargeable battery and Y indicates that of the other rechargeable battery. In this example, discharging of the rechargeable batteries is interrupted in the ease of X≦2.0 V and Y≦2.0 V or in the case of X+Y≦4.8 V. In this figure, the broken line shows that the voltage which cuts the use of an electric appliance in which the rechargeable batteries are used is 6 V.

As above-mentioned, an overdischarge prevention circuit according to the present invention comprises a and redischargeable rechargeable battery, a first switch element connected in series to the battery, a second switch element connected in parallel to the series circuit connecting the rechargeable battery and the first switch element, and a control circuit for controlling ON and OFF states of the first and second switch elements, the control circuit being so constructed as to turn OFF the first switch element and at the same time turn ON the second switch element when the battery voltage of the rechargeable battery becomes lower than a predetermined value, and turn ON the first switch element when a charging voltage is applied to the rechargeable battery, so that overdischarge of the rechargeable battery can be easily and reliably prevented.

What is claimed is:
1. An overdischarge prevention circuit, comprising:
 (a) a rechargeable battery,
 (b) a first switch element connected in series to said rechargeable battery to form a series circuit,
 (c) a second switch element connected in parallel to said series circuit of said rechargeable battery and said first switch, and
 (d) a control means for controlling ON and OFF states of said first switch element and said second switch element, said control means for turning OFF said first switch element and at the same time turning ON said second switch element when the battery voltage of said rechargeable battery becomes lower than a predetermined value, for then maintaining the OFF state of said first switch element and the ON state of said second switch element regardless of the battery voltage, and for then turning ON said first switch element when a charging voltage is applied to said rechargeable battery.

2. An overdischarge prevention circuit as claimed in claim 1, further comprising a resistance element connected in series with said second switch element to form a second series circuit which is connected in parallel to said series circuit of said rechargeable battery and said first switch element.

3. An overdischarge prevention circuit, comprising:
   (a) a rechargeable battery,
   (b) a first switch element connected in series to said rechargeable battery to form a series circuit,
   (c) a second switch element connected in parallel to said series circuit of said rechargeable battery and said first switch element, and
   (d) a control means for controlling ON and OFF states of said first switch element and said second switch element, said control means for turning OFF said first switch element and at the same time turning ON said second switch element when the battery voltage of said rechargeable battery becomes lower than a predetermined value, and for then turning ON said first switch element when a charging voltage is applied to said rechargeable battery,
   said control means including a first detector which detects that the battery voltage of said rechargeable battery is lower than the predetermined value, a second detector which detects that the charging voltage is applied to said rechargeable battery, and a change-over circuit which changes over ON and OFF states of said first switch element and said second switch element in accordance with detection results of said first detector and said second detector.

4. An overdischarge prevention circuit as claimed in claim 3, wherein said change-over circuit includes an OR gate and an inverter, and wherein an output of said first detector and an output of said second detector are connected to respective inputs of said OR gate, and wherein an output of said OR gate is connected to an input of said inverter.

5. An overdischarge prevention circuit as claimed in claim 4, wherein an output of said inverter is connected to said first switch element and the output of said OR gate is connected to said second switch element.

6. An overdischarge prevention circuit as claimed in claim 4, wherein said first switch element is a first FET and said second switch element is a second FET, and wherein an output of said inverter and the output of said OR gate are respectively connected to a gate of said first FET and a gate of said second FET.

7. An overdischarge prevention circuit as claimed in claim 3, wherein said rechargeable battery is a lithium-ion rechargeable battery and wherein the predetermined value is 2.0 V.

8. An overdischarge prevention circuit as claimed in claim 3, wherein said rechargeable battery is a lithium-ion rechargeable battery, and said second detector is for detecting that the charging voltage applied to said rechargeable battery is 1.9 V.

9. An overdischarge prevention circuit as claimed in claim 3, wherein said change-over circuit includes a flip-flop and an inverter, and wherein an output of said flipflop is connected to an input of said inverter.

10. An overdischarge prevention circuit as claimed in claim 9, wherein an output of said inverter is connected to said first switch element and the input of said inverter is connected to said second switch element.

11. An overdischarge prevention circuit as claimed in claim 9, wherein said first switch element is a first FET and said second switch element is a second FET, and wherein an output of said inverter is connected to a gate of said first FET and the input of said inverter is connected to a gate of said second FET.

12. An overdischarge prevention circuit as claimed in claim 3, wherein said change-over circuit includes a NOR gate and an inverter, and wherein respective inputs of said NOR gate are connected to an output of said first detector and an output of said second detector, and wherein an output of said NOR gate is connected to an input of said inverter.

13. An overdischarge prevention circuit as claimed in claim 12, wherein said control means includes a control switch for supplying electric power to said first detector, and wherein said control switch is turned ON and OFF responsive to the output of said NOR gate.

14. An overdischarge prevention circuit as claimed in claim 12, wherein an output of said inverter is connected to said first switch element and the input of said inverter is connected to said second element.

15. An overdischarge prevention circuit as claimed in claim 3, wherein said rechargeable battery is a lithium-ion battery, and wherein said second detector is for detecting that the charging voltage applied to said rechargeable battery is 3 V.

* * * * *